Jan. 9, 1934.  E. SCHNEIDER  1,942,780
VENTING DEVICE FOR LIQUID RESERVOIRS
Filed May 17, 1932
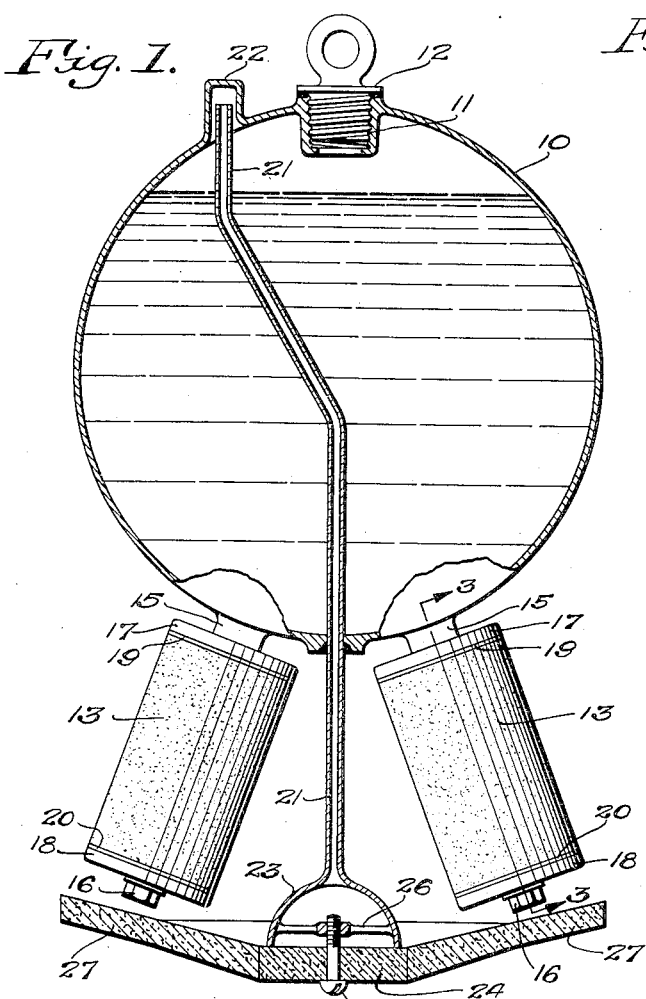
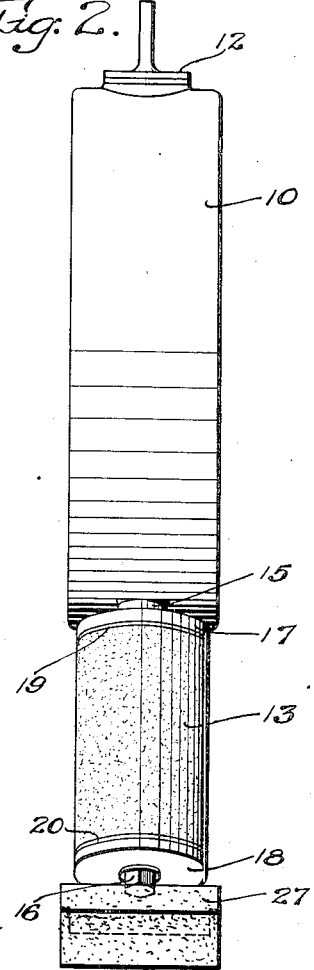
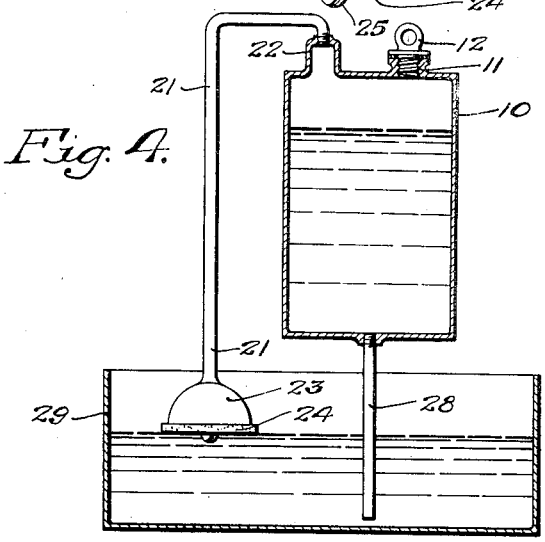
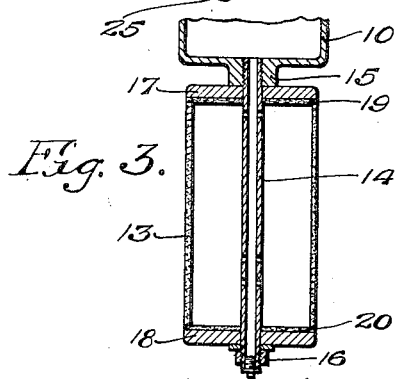
Inventor:-
Emil Schneider,
by his Attorney,
Jas. C. Hobensmith Patented Jan. 9, 1934

1,942,780

UNITED STATES PATENT OFFICE 1,942,780

VENTING DEVICE FOR LIQUID RESERVOIRS

Emil Schneider, Philadelphia, Pa.

Application May 17, 1932. Serial No. 611,776

6 Claims. (Cl. 299—23)

My invention relates to a venting device for liquid reservoirs, that is to say, to means for controlling the admission of air to the top of a closed liquid container, for the purpose of controlling the flow of the liquid therefrom.

The principal object of my invention is to provide improved means of a non-mechanical nature (that is to say, which is characterized by the absence of moving parts) for controlling the admission of venting air to the top of a closed liquid reservoir.

My invention will be found in practice to have a wide variety of application, of which typical instances are herein shown and described by way of illustration, it being understood that the invention is equally applicable to many other kinds of apparatus in which the flow of liquid from a closed reservoir is to be automatically controlled by the venting of air to the top thereof at the proper times.

The nature and characteristic features of my invention will be more readily understood from the following description, taken in connection with the accompanying drawing forming part hereof, in which:

Figure 1 is a view, partly in section and partly in elevation, of humidifying apparatus having the device of my present invention shown applied thereto;

Fig. 2 is a side elevation of the apparatus shown in Fig. 1;

Fig. 3 is a transverse section taken on the line 3—3 of Fig. 1; and

Fig. 4 is a view, partly in section and partly in elevation, illustrating a water tank in which a constant level of the water is to be maintained, and a reservoir containing a supply of replenishing water, the device of my present invention being shown in connection therewith for automatically controlling the flow of water from the reservoir to the tank to maintain the level therein.

It will, of course, be understood that the description and drawing herein contained is illustrative merely, and that various modifications and changes may be made in the structures disclosed without departing from the spirit of the invention.

Referring now more particularly to Figs. 1, 2, and 3 of the drawing, the device of my present invention is there shown as applied to a humidifier, that is to say, to a device for raising the moisture content of the air in a room of a building, such as a dwelling or the like.

As there shown, 10 is a tank or reservoir, made of any suitable material and of any desired shape and configuration. The reservoir 10 may be provided with a filling opening 11 at the top, normally closed by a stopper 12 threaded therein.

Disposed beneath the reservoir 10 are shown two evaporators, secured in any suitable manner to the bottom of said reservoir, and each comprising a hollow porous cup 13, the interior of which is in communication with the bottom of the reservoir.

For the purpose of providing the communication between the interior of the reservoir 10 and the interior of the porous cups 13 at the bottom of said reservoir, and also for the purpose of mounting the porous cups 13 in position, there is provided, for each of said porous cups, a downwardly extending pipe 14, threaded in a suitable boss 15 provided at the bottom of the reservoir 10.

The lower end of the pipe 14 is closed, and has a clamping nut 16 threaded thereon. Washers 17 and 18 are also mounted on the pipe 14, and between these washers the porous cup 13 is secured. Sealing gaskets 19 and 20 are interposed between the ends of the porous cup 13 and the washers 17 and 18, respectively.

The portion of the pipe 14 which extends through the porous cup 13 is perforated to permit the water to flow from the interior of said pipe to the interior of the porous cup.

The foregoing arrangement is such that when air is admitted to the top of the reservoir 10, in the manner to be hereinafter set forth, the water will flow from the bottom of the reservoir 10, through the pipes 14, to the interior of the porous cups 13, and will seep through the porous walls thereof, to be evaporated for the purpose of raising the humidity of the air in the room in which the device is used.

The device of my invention, which is adapted for use in connection with the apparatus above described, comprises a vent pipe 21, the upper end of which terminates in the top of the reservoir 10, preferably in an auxiliary chamber provided by the small dome-like extension 22 in the top wall of said reservoir.

The bottom of the vent pipe 21 is preferably expanded, as at 23, to provide an enlarged mouth, and upon this enlarged mouth 23 there is mounted a plate 24, made of porous material such as burned clay or the like, which is of such degree of porosity that when dry it will permit air to pass therethrough. However, when the intestices or voids of the material of the porous plate 24 are closed by the presence of water or moisture, the same will act as a seal and will prevent the air from passing therethrough.

The porous plate 24, which is mounted on the enlarged mouth 23 at the lower end of the vent pipe 21, may be secured thereto in any suitable manner, such as by the screw 25 which extends through the porous plate 24 and has its inner end threaded in a bridge piece 26 extending across the mouth 23.

Secured to the porous plate 24, which is mounted upon the lower end of the vent pipe 21, are wings 27 which extend under the evaporator cups 13, for the purpose of catching any drip water which may fall therefrom, which water will then be conveyed to the porous plate 24, either by capillary action if the wing members themselves are made of porous material, or by direct flow to the porous plate if said wing members are made of impervious material.

The operation of the device shown in Figs. 1, 2, and 3 of the drawing will now be readily understood. Whenever the porous plate 24 is in a dry condition, air will be permitted to pass therethrough and thence through the vent pipe 21 to the top of the reservoir 10, thus permitting the water contained in the reservoir 10 to flow through the pipes 14 to the evaporator cups 13, and thereby moisten the outer surfaces thereof, whence it will be evaporated to raise the humidity of the air in the room in which the device is mounted.

Should any quantity of water flow to the evaporator cups 13 in excess of that which is being evaporated from the surfaces thereof, the same will drop and fall upon the wing members 27, and thence be carried to the porous plate 24 which is secured to the enlarged mouth 23 at the lower end of the vent pipe 21. As soon as the porous plate 24 becomes sufficiently moistened, the enlarged mouth 23 of the vent pipe 21 will thus be sealed, and as long as the plate remains in a moistened condition, no more air will be permitted to pass through the vent pipe 21. In this manner, flow of the water from the reservoir 10 to the evaporator cups 13 will be stopped. Consequently, further dripping of the excess water to the wing members 27 will cease, and in due course the moisture contained within the interstices or voids of the porous plate 24 will be evaporated, and air will again be permitted to flow to the top of the reservoir.

It will be found in practice that, in most instances, a balance will occur, so that very little dripping from the evaporator cups 13 to the wing members 27 will take place.

The device shown in Fig. 4 of the drawing is, in many respects, similar to that shown in Figs. 1, 2, and 3. As hereinbefore pointed out, the device of my invention is here shown as arranged for the purpose of maintaining a fairly constant level of water in a tank.

In this instance, a pipe 28 extends from the bottom of the reservoir 10, downwardly to a point near the bottom of the tank 29 in which the level of the water is to be maintained. The vent pipe 21 extends from the top of the dome 22 provided at the top of the reservoir 10, and the porous plate 24, which is mounted on the enlarged mouth 23 provided at the lower end of the vent pipe 21, is so positioned that when the water rises within the tank 29 to the desired level, the same will contact with the porous plate 24. The mouth 23 of the vent pipe 21 will thus be sealed by the water which will be taken up by the porous plate 24 whenever the level thereof rises and the water thus comes in contact with said porous plate.

When the level of the water within the tank 29 falls the water or moisture contained within the interstices of the porous plate 24 will be evaporated therefrom, and the air will again be permitted to pass through the vent pipe 21 to the top of the reservoir 10.

It will be noted that, in each instance when the porous plate 24 approaches the dry condition, there will be a certain amount of suction due to the weight of the water within the reservoir 10, which will tend to break the seal as the porous plate approaches the dry state.

The purpose of the enlargement at the lower end of the vent pipe 21 is to provide, a mouth therefor, so that a sufficient area of the porous plate 24 will be available to permit the requisite quantity of air to pass therethrough. The extent of this enlargement will be varied in practice, depending upon the amount of air to be vented, and the degree of porosity of the porous plate 24, as well as upon the thickness thereof.

I claim:

1. The combination, with a liquid reservoir having a closed top, of means for venting the same to control the flow of liquid therefrom, said means comprising a vent pipe extending to the top of the reservoir, a porous member mounted on the lower end of said pipe, said porous member being adapted when in a dry condition to permit air to pass therethrough but forming a seal when moisture is contained within the pores thereof, and a receiver for liquid flowing from the reservoir, said porous member being so positioned with respect to said receiver as to be moistened by the liquid when an excess thereof flows from the reservoir to the receiver.

2. The combination, with a liquid reservoir having a closed top, of means for venting the same to control the flow of liquid therefrom, said means comprising a vent pipe extending to the top of the reservoir and having its lower end formed into an enlarged mouth; a porous plate mounted on said enlarged mouth, said porous plate being adapted when in a dry condition to permit air to pass therethrough but forming a seal when moisture is contained within the pores thereof, and a receiver for liquid flowing from the reservoir, said porous plate being so positioned with respect to said receiver as to be moistened by the liquid when an excess thereof flows from the reservoir to the receiver.

3. The combination, with a liquid reservoir having a closed top, of means for controlling the flow of liquid therefrom, said means comprising a vent pipe extending to the top of the reservoir, and a porous member mounted on the lower end of said vent pipe, said porous member being adapted when in a dry condition to permit air to pass therethrough but forming a seal when moisture is contained within the pores thereof; and means for directing liquid from the reservoir to the porous member to seal the vent pipe and thus stop the flow of liquid from the reservoir.

4. The combination, with a liquid reservoir having a closed top, of means for controlling the flow of liquid therefrom, said means comprising a vent pipe extending to the top of the reservoir and having its lower end formed into an enlarged mouth, and a porous plate mounted on said mouth, said porous plate being adapted when in a dry condition to permit air to pass therethrough but forming a seal when moisture is contained within the pores thereof; and means for directing liquid from the reservoir to the porous plate to seal the vent pipe and thus stop the flow of liquid from the reservoir.

5. The combination, with a liquid reservoir having a closed top and a tank adapted to receive liquid flowing therefrom, of means for controlling the flow of liquid from the reservoir to the tank comprising a vent pipe extending to the top of the reservoir, and a porous member mounted on the lower end of said vent pipe, said porous member being positioned in the tank at the desired level of the liquid contained therein, and said porous member being adapted when in a dry condition to permit air to pass therethrough but forming a seal when moisture is contained within the pores thereof.

6. The combination, with a liquid reservoir having a closed top and a tank adapted to receive liquid flowing therefrom, of means for controlling the flow of liquid from the reservoir to the tank comprising a vent pipe extending to the top of the reservoir and having its lower end formed into an enlarged mouth, and a porous plate mounted on said mouth, said mouth with the plate mounted thereon being positioned in the tank at the desired level of the liquid contained therein, and said porous plate being adapted when in a dry condition to permit air to pass therethrough but forming a seal when moisture is contained within the pores thereof.

EMIL SCHNEIDER.